United States Patent [19]

Rosenberg

[11] Patent Number: 5,439,338
[45] Date of Patent: Aug. 8, 1995

[54] ANCHORAGE AND INSTALLATION TOOL

[76] Inventor: Mikael Rosenberg, Agatan 35 B, S-295 34 Bromölla, Sweden

[21] Appl. No.: 240,744
[22] PCT Filed: Nov. 11, 1992
[86] PCT No.: PCT/SE92/00775
§ 371 Date: May 10, 1994
§ 102(e) Date: May 10, 1994
[87] PCT Pub. No.: WO93/10363
PCT Pub. Date: May 27, 1993

[30] Foreign Application Priority Data

Nov. 13, 1991 [SE] Sweden .................. 9103335

[51] Int. Cl.6 .................. F16B 23/00; F16B 25/00; B25B 13/00
[52] U.S. Cl. .................. 411/400; 411/29; 411/387; 81/124.2; 81/176.15
[58] Field of Search .................. 411/29, 387, 400, 401, 411/409; 81/124.2, 176.1, 176.15, 176.2, 121.1

[56] References Cited

U.S. PATENT DOCUMENTS

| 316,650 | 4/1885 | Perkins | 411/400 |
| 842,933 | 2/1907 | Bement | 411/400 |
| 1,188,305 | 6/1916 | Noerteman | 411/409 |
| 2,231,323 | 2/1941 | Cawood | 81/124.2 |
| 3,151,512 | 10/1964 | Charczenko | 81/176.1 |
| 3,354,756 | 11/1967 | Rusk | 81/176.15 |
| 4,275,621 | 6/1981 | Mallott, Sr. | 81/124.2 |
| 4,689,881 | 9/1987 | Fall | 29/813 |
| 4,764,069 | 8/1988 | Reinwall et al. | 411/397 |

FOREIGN PATENT DOCUMENTS 2721870 3/1983 Germany .
1-199774 8/1989 Japan .
818530 8/1959 United Kingdom .

OTHER PUBLICATIONS

Patent Abstracts of Japan, vol. 13, No. 498, M890, abstract of JP 01-199774, publ. 1989-08-11 (Matsushita Electric Ind. Co. Ltd.).

Primary Examiner—Neill R. Wilson
Attorney, Agent, or Firm—Ladas & Parry

[57] ABSTRACT

An anchorage arrangement in the form of a socket (1) and anchor bolts (5) for anchoring scaffolds at walls or the like. The socket (1) has an inner cruciform recess (3) with conical chamfers (4) which are adapted to the form of a conical extension (7) on the anchor bolts (5). When screwing in an anchor bolt (5), the eye (6) of a bolt (5) is placed in the recess (3) of the socket (1), whereby the conical extension (7) of the bolt (5) and the chamfers (4) cooperate, partly to guide the application of the socket (1) onto the bolt (5), and partly to stabilize the bolt (5) in the socket (1) during the operation of screwing the bolt into a wall. The socket (1) is rotated by a drill after inserting an insert pin (2) on the socket in the drill chuck. The conical extension (7) may be an integrated part of the bolt (5), but is preferably threaded on the bolt (5).

13 Claims, 5 Drawing Sheets

ANCHORAGE AND INSTALLATION TOOL

FIELD OF THE INVENTION

The present invention relates to an anchorage arrangement for e.g. anchoring of scaffolds at walls or the like, which arrangement consists of a screw socket and an anchor bolt.

BACKGROUND

When mounting scaffolds the scaffold must be anchored in a safe way. This is done by securing the scaffold at a large number of points by anchor bolts screwed into the wall at which the scaffold is mounted. Today this is normally done by first drilling a hole in the wall, and then hammering a plug into said hole, whereafter the anchor bolt is screwed in manually in the the wall in order to anchor the scaffold. It is both a tiresome and time consuming to manually screw in the anchor bolts.

The concern of the invention is the large strains, specially in the shoulders, experienced by scaffolders in presently used manual method to screw in anchor bolts. It has been found in practice that the installers, due to being pressed for time, often are careless with the important anchoring, as it is both time consuming and tiresome to screw in anchor bolts in the prescribed number. Of course this is unacceptable from the view point of security.

The use of the anchorage according to the invention is not limited to scaffolds but can be used anywhere when some kind of anchorage arrangement is needed. Examples of other fields of use are railings, fences, wire carriers, fireladders and lifting eye bolts for e.g. rocks.

SUMMARY OF THE INVENTION

Thus, the object of the present invention is to facilitate to screw in the anchor bolts by making it possible to use an ordinary drilling machine for the actual screwing in.

This object is met with an anchorage arrangement an anchor bolt cooperating with a socket furnished with an insert pin for connection with a drilling machine or the like, the socket having a cruciformed inner recess furnished with chamfers formed at each of the inner corners of the recess and decreasing inwardly in the socket, the chamfers cooperating with an extension in the form of a cone on the anchor bolt.

When using the arrangement according to the invention the socket is placed in a drill chuck, or other suitable rotary drive means, in the normal way. In the inner cruciformed recess, the eye of the cone on the anchor bolt fits. Furthermore, the anchor bolt has a corresponding form to that of the chamfers on the recess within the socket. The cone and chamfers partly act to guide the application of the socket on the anchor bolt and partly to hinder the stem of the anchor bolt from striking against the parts of the socket during the screwing operation.

In schaffold mounting the normal distance from the plank platform on which one stands at the mounting of the anchor bolts and the hole in which the anchor bolt is to be screwed in is about 2 m, which gives a cumbersome working posture with large strain particularly on the shoulder 3 during the presently used method of manually screwing in anchor bolts. This work is facilitated by the invention by which one can use the some drilling machine for both screwing in of the anchor bolts and to drill the holes in the wall in which the anchor bolts are screwed in. By using a drilling machine the bolts are screwed in with a greater force, which expands the plugs in the wall more and gives a stronger anchoring. Due to the cruciformed recess of the socket with chamfering and the cone of the anchor bolt it is fast and easy to screw in the bolts without the bolt stem striking against the socket. This becomes more important if the scaffold, as often happens with additional insulation, is mounted at a relative large distance from the walls whereby long anchor bolts must be used. Without the chamfers and the cone it would be very difficult to screw in the anchor bolts without them striking against the socket. Furthermore it is a clear risk that the anchor bolts will strike so much that they affect the hole in the wall.

When sheeting the scaffold, i.e. covering it with plastics, almost twice as many anchor bolts must be used due to the surface exposed to the wind.

BRIEF DESCRIPTION OF THE DRAWINGS

The invention is more closely explained below by means of embodiments shown in the enclosed drawings, in which.

Figure 1:
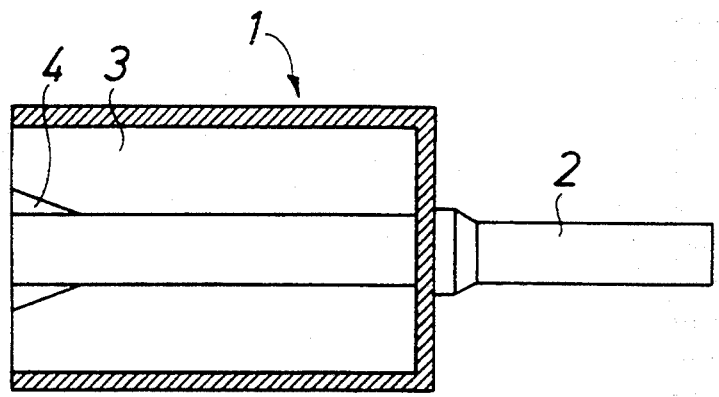
FIG. 1 is a sectional view of the socket taken along the line I—I in FIG. 2.
Figure 2:
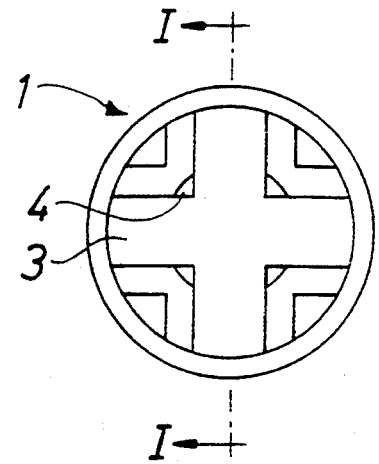
FIG. 2 is an end view showing the interior of the socket.
Figure 3:
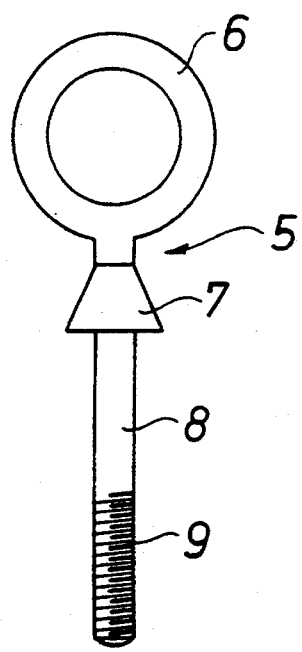
FIG. 3 is a side view of one anchor bolt.

The present invention thus refers to a socket and anchor bolt arrangement for use in anchoring of scaffolds at walls or the like.

The arrangement consists of a socket 1 with a pin 2 for connection with e.g. a drill chuck and an anchor bolt 5. The interior of the socket 1 has a cruciformed recess 3, with chamfers 4. The anchor bolt 5 has an eye 6 and an extension in the form of a cone 7 between the eye 6 and the bolt stem 8. Furthermore the bolt 5 is threaded at 9 so it can be screwed into the wall.

The cone 7 may be an integrated or welded part of the anchor bolt 5, or a loose cone screwed onto the bolt. The cone 7 may be made of aluminum, steel or the like. The screwable cone is furnished with an interior thread corresponding to the thread of the bolt 5, the bolt suitably being threaded all the way up to the eye 6. By such an arrangement the position of the cone 7 on the bolt 5 may be altered as required.

When using the invention one may in a normal way drill a number of holes in the wall which then are furnished with plugs. Then the socket is placed in e.g. a drill chuck (not shown) by means of the inlet pin 2. When the anchor bolts 5 then are to be screwed into the drilled and plugged holes in the building wall the eye 6 of the bolt 5 is placed in the recess 3, whereby the cone 7 cooperated with the chamfers 4 of the recess 3 in order to give a secure, reliable and stable contact between the anchor bolt 5 and the socket 1.

The screw part 9 of the anchor bolt 5 is adapted to the actual use. It is thereby possible to use e.g. self-drilling bolts 5 for wood, concrete or lightweight concrete etc., with or without an expander 11. Then there is no need for any predrilling. Examples of different anchor bolts 5 with different kinds of threads 9 are shown in FIGS. 4a to 4h.

The chamfers 4 are largest at the open end of the socket and decrease inwardly of the socket 1 at the same angle as shown by the cone 7 on the anchor bolt 5. In this way a large contact surface is obtained between the socket 1 and the bolt 5 which functions as a guide for the application of the socket on the bolt besides stabilizing the screwing.

Besides acting to guide the socket during the screwing in of the bolt the cone 7 furthermore acts as a stiffening means for the bolt 5 itself. Furthermore, the cone 7 may assist in stiffening of the attachment of the anchor bolt in the wall by abutting against the wall.

A further advantage with the anchorage arrangement of the invention is that for anchor bolts 5 with non-integrated cones 7, the cone may be post tensioned against the wall in order to further strengthen the anchorage, making the plug in the wall expand better, which gives a stronger anchorage. Furthermore it is possible, if necessary, to make the cone 7 bigger by e.g. design it with a straight part 14a, 14e, 14g, 14h after the cone 7. In order to facilitate the post tensioning the cone 7, as well as the chamfers, the straight part may be hexagonal or octagonal or straight, and may have the form of a nut. The cone is very important at lateral displacement or pressure from above for suspended scaffolding.

Figure 5:
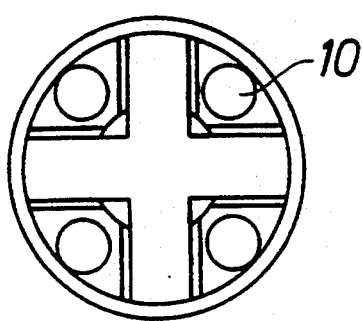
FIGS. 5 and 6 are sectional views of the socket furnished with magnetic rods and rubber coatings, respectively.

It is suitable to arrange some kind of attachment in the socket 1, i.e. means which keep the bolt 5 in place even if the socket 1 is directed downwardly. There are many conceivable ways to achieve this. The preferred way at present is to, in accordance with FIG. 5, integrate magnetic rods 10 in the socket, which magnets 10 are dimensioned in order to securely hold the anchor bolts 5 within the socket 1.

Figure 6:
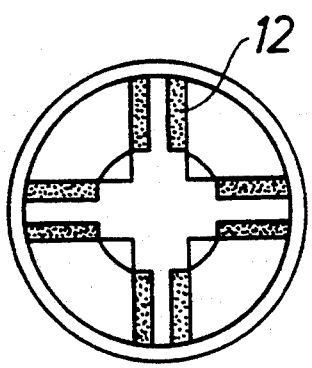
Figure 7:
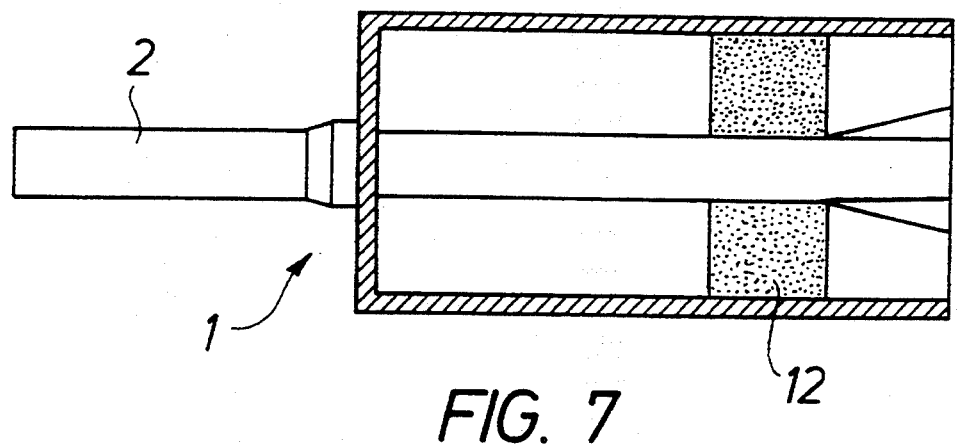
FIG. 7 is a sectional view of the socket furnished with rubber coatings in accordance with FIG. 6.

Instead of magnets 10 the channels 3 of the socket 1 may be lined with raw rubber 12 in accordance with FIGS. 6 and 7 whereby the friction between the eye 6 and the rubber 11 is enough to keep the bolt 5 in place. This is particularly suitable when using hammer drills.

In order to be able to replace worn rubber coatings 12 the socket 1 may consist of two parts, with the two parts assembled by means of threads (not shown). The joint surfaces of the socket parts can hereby be arranged on any side of the rubber elements 12. When the rubber elements 12 are to be replaced the socket is open by unscrewing the two part from each other, the worn rubber coatings 12 are taken off and new coating are put in, whereafter the parts of the socket 1 are once again screwed together and then is ready for use.

As a further alternative to the attachment for the bolt 5 in the socket 1 it is conceivable to use spring biased clips in the socket 1.

Figure 4A:
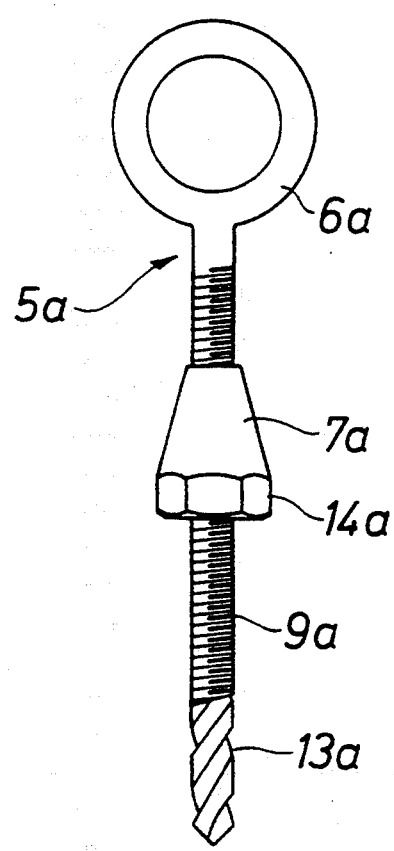
FIGS. 4a–4h are side views of different anchor bolts.
Figure 4B:
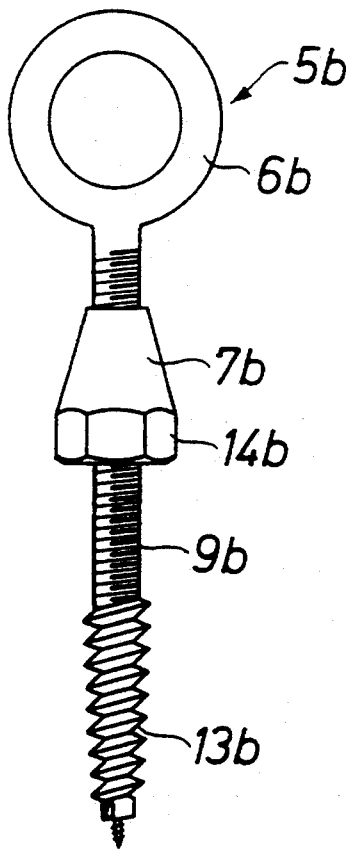

The bolts 5a and 5b according to the FIGS. 4a and 4b, respectively, are a self-drilling steel bolt and wood bolt, respectively.

Figure 4C:
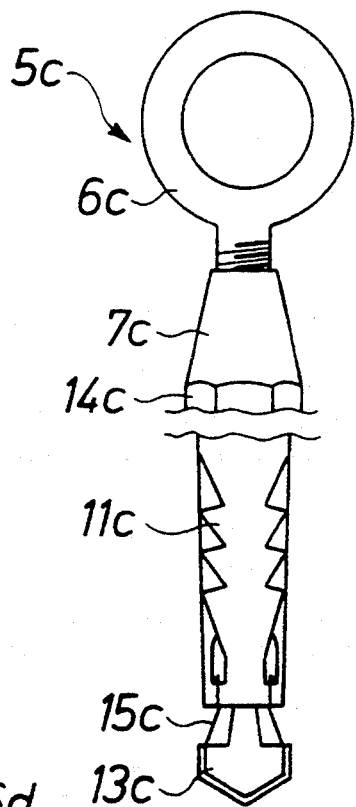

The bolt 5 according to FIG. 4c, which is intended for concrete has a self-drilling end 13c and has an expander 11c. When bolt 5c has been screwed in by means of the socket 1 it is post-tensioned by the cone 7c being screwed in whereby the expander 11c expands by being pushed onto the conically expanded part 15c behind the drill end 13c. Such a bolt 5c gives a reliable anchorage and get its strength from several cooperating factors such as the pressure of the expander 11c against the walls of the drilled hole and the abutment of the cone 7c against the wall in which the bolt 5c has been screwed in. It is possible to re-use this bolt 5c with the expander 11c. When the bolt 5c is to be loosened the cone 7c is first loosened, then the bolt 5c is striked inwardly a distance corresponding to the expansion of the expander 11c, whereby the expander 11c is compressed by springs arranged in the expander 11c. In order to support this movement a pin may be arranged affecting the springs. The outer surface of the expander 11c may furthermore have the shape of a drill in order to remove material from the drilled hole at the screwing in. Also, this surface form gives the expander 11c a stronger abutment against the drilled hole. The expander 11c can be made of many different materials such as steel, aluminum, plastics or rubber. If rubber is used it is suitable to arrange small spikes on the outer surface in order to remove material from the drilled hole.

Figure 4D:
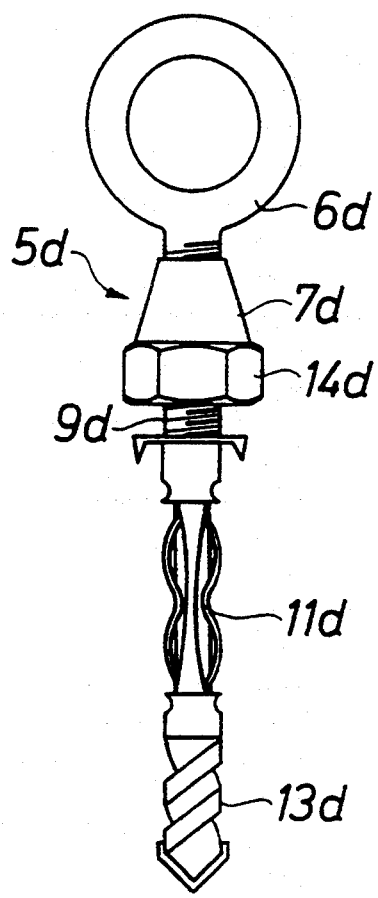

The bolt 5d according to FIG. 4d has a self-drilling end 13d and is intended for lightweight concrete and is furnished with an expander 11d.

Figure 4E:
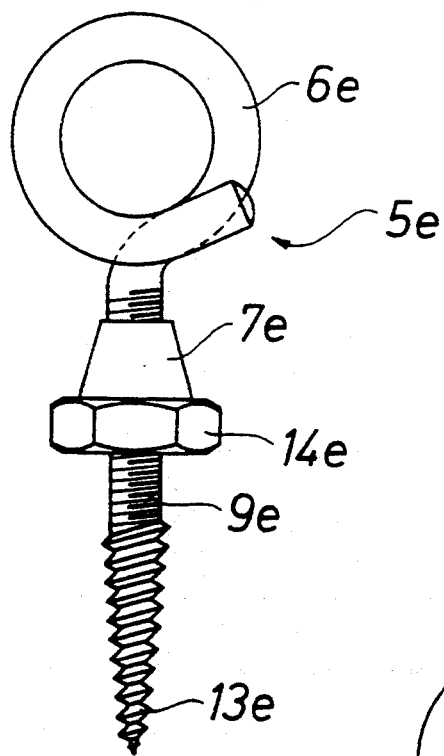

The bolt 5e according to FIG. 4e is a wood bolt with open eye 6e. By the special form of this eye 6e a special socket 1' must be used, which corresponds to the socket 1 above except that instead of the cruciformed inner recess 3 the socket 1' has a recess 3' adapted to the form of the eye 6e. In the example shown the socket 1' is furthermore furnished with magnetic rods 10.

Figure 4F:
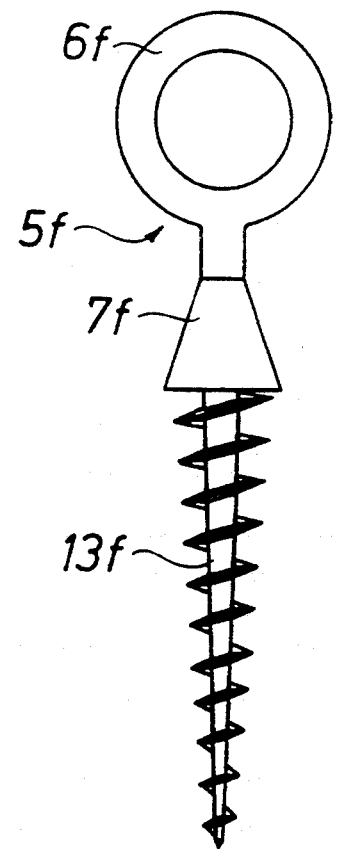

In FIG. 4f a bolt 5f is shown, has a self-drilling thread 13f and is intended for lightweight concrete.

Figure 4G:
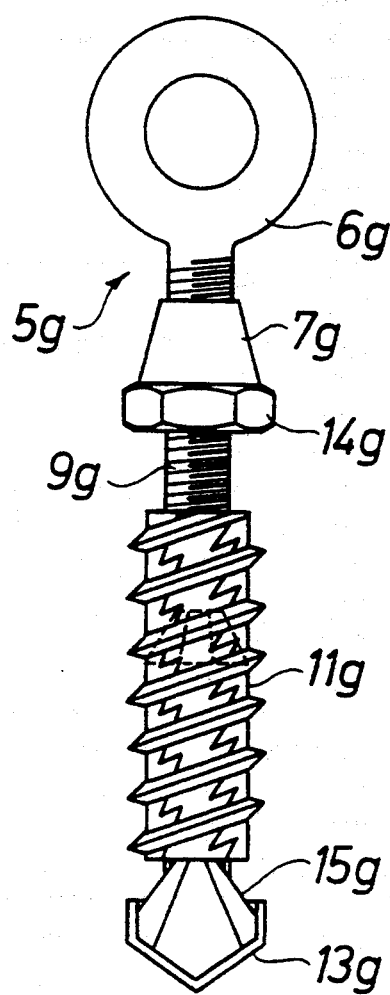

The bolt 5g according to FIG. 4g has a self-drilling end 13g with expander 11g intended for concrete. The outer surface of the expander 11g has a form which corresponds to a drill in order to remove material from the drilled hole during the screwing in of the bolt.

Figure 4H:
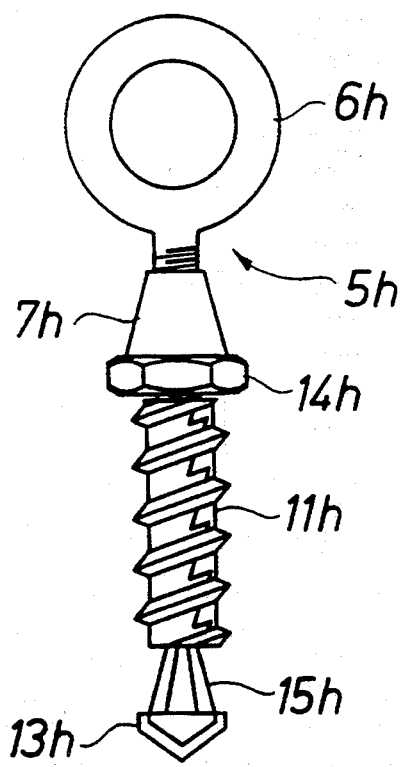

In FIG. 4h a bolt 5h is shown which has a self-drilling end 13h and a divisible expander 11h with an outer "drill shaped" surface.

Figure 8:
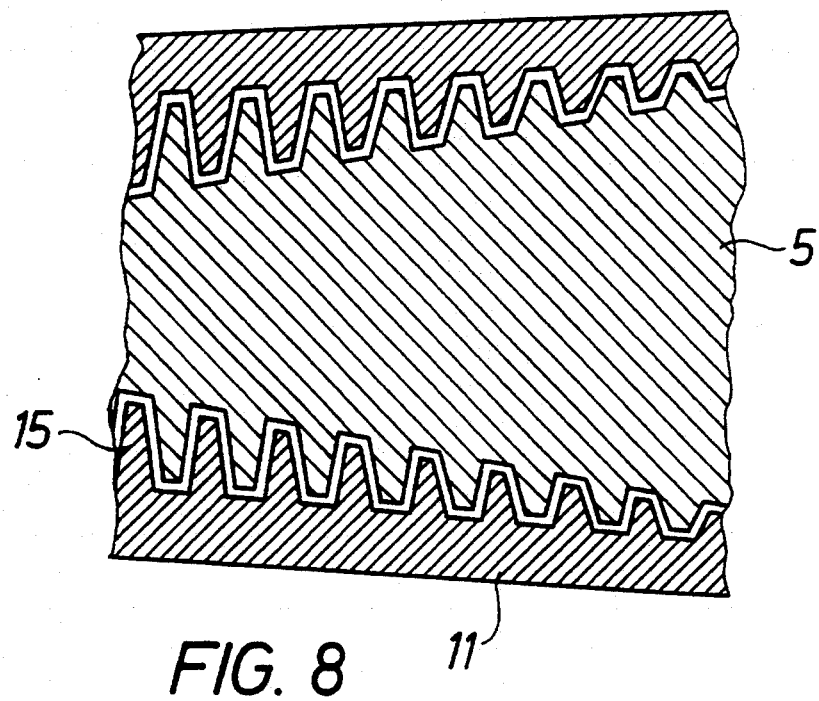
FIG. 8 is a sectional view showing a detail of one type of expander.
Figure 9:
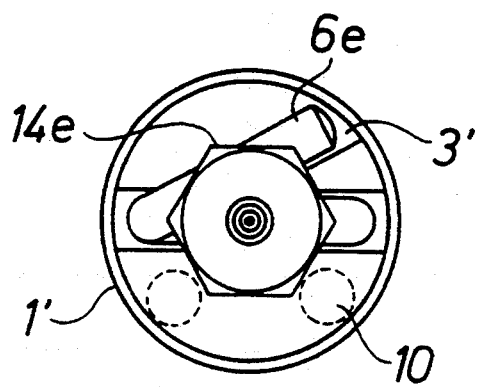
FIG. 9 is a plan view of a socket intended for the anchor bolt according to FIG. 4e.

A further form of expander 11, which e.g. could be used with the bolt 5h according to FIG. 4h, is shown in section in FIG. 8. As is evident from the figure the inner surface of the expander 11 is furnished with a wedge-shaped thread 15 adapted to the thread of the bolt 5. This expander is used as follows. When the bolt 5 has been inserted to the bottom with the cone 7, or its extension 14, abutting against the wall the cone 7 is held with a wrench, then the bolt 5 is screwed out by means of e.g. a screwdriver introduced through the eye 6. Thus expanding the expander by means of the wedge-shape of the thread 15. The more the bolt is screwed out the more the expander 11 tightens. When the bolt 5 then is screwed back in the expander 11 retracts due to the thread 15. This makes it possible to then withdraw the bolt 5.

The different bolts 5a–h in the figures are shown as examples of how the invention may be used in different ways in practice, and persons skilled in the art realize that there are many different possibilites of variation concerning dimension, selection of material, type of thread etc.

What is claimed is:

1. An anchorage arrangement for anchoring a member to a wall, said anchorage arrangement comprising a socket and an anchor bolt engageable in said socket, said socket having an inner recess formed by intersecting channels defining a cruciform section for said recess, said socket including an extension pin drivingly connectable to a rotary drive means so that the socket can be driven in rotation, said socket having four chamfers formed at intersecting corners of the channels of the recesses, said chamfers extending from an open end of the socket inwardly thereof and being tapered to diminish in height as the chamfers extend inwardly of the socket, said anchor bolt including a stem, an end portion on said stem and a conical extension secured to said stem, said end portion being engageable in said recess in said socket with said conical extension engaging said chamfers.

2. An anchorage arrangement as claimed in claim 1, wherein said end portion of the anchor bolt comprises an eye, said stem including a threaded end opposite said eye.

3. An anchorage arrangement as claimed in claim 1, wherein said conical extension is integral with said stem.

4. An anchorage arrangement as claimed in claim 1, wherein said stem is threaded from said end portion to an opposite end of the stem, said conical extension being threadably engaged on said stem.

5. An anchorage arrangement as claimed in claim 1, wherein said chamfers are tapered at an angle corresponding to an angle of taper of said conical extension, said conical extension having end diameters which enable the conical extension to be engageably fitted in said chamfers.

6. An anchorage arrangement as claimed in claim 1, wherein said bolt includes a self drilling end part at an end of the bolt opposite said end portion.

7. An anchorage arrangement as claimed in claim 6, comprising an expander means in said stem for expanding in a hole in a wall.

8. An anchorage arrangement as claimed in claim 1, comprising magnetic rods in said socket to retain the anchor bolt in said recess in the socket.

9. An anchorage arrangement as claimed in claim 1, comprising linings of friction material at said channels of the recess to hold the bolt in said recess.

10. An anchorage arrangement as claimed in claim 1, wherein said conical extension is made of aluminum, steel or plastic material.

11. An anchorage arrangement as claimed in claim 1, comprising an extension portion on said conical extension, said extension portion extending coaxially from said conical extension portion in a direction away from said end portion.

12. An anchorage arrangement as claimed in claim 11, wherein said extension portion on said conical extension is formed as a nut.

13. An anchorage arrangement as claimed in claim 1, wherein socket is tubular.

* * * * *